United States Patent [19]
Eales

[11] Patent Number: 5,135,702
[45] Date of Patent: Aug. 4, 1992

[54] EXTRUSION BLOW MOLDING PROCESS FOR FORMING MULTI-COMPARTMENT CONTAINERS

[76] Inventor: George E. Eales, 527 W. Olive Ave., Redlands, Calif. 92373

[21] Appl. No.: 578,551

[22] Filed: Sep. 4, 1990

[51] Int. Cl.$^5$ .................. B29C 49/04; B29C 49/20
[52] U.S. Cl. ............................ 264/516; 264/515; 425/503; 425/525
[58] Field of Search .............. 264/516, 515, 513, 512, 264/529, 530; 425/503, 525, 504

[56] References Cited

U.S. PATENT DOCUMENTS

| | | | |
|---|---|---|---|
| D. 192,980 | 6/1962 | Mangini et al. | D58/6 |
| D. 214,549 | 7/1969 | Ledewitz | D9/1 |
| D. 263,118 | 2/1982 | Weckman | D9/341 |
| D. 280,599 | 9/1985 | Green | D9/341 |
| 3,650,841 | 3/1972 | Brindley | 136/132 |
| 3,673,302 | 6/1972 | Halsall et al. | 264/328 |
| 4,065,536 | 12/1977 | Lucas | 425/525 |
| 4,196,808 | 4/1980 | Pardo | 206/432 |
| 4,239,839 | 12/1980 | McDowall et al. | 429/154 |
| 4,264,295 | 4/1981 | Hingley | 425/577 |
| 4,522,315 | 6/1985 | Rapp | 222/142.1 |

FOREIGN PATENT DOCUMENTS

| | | | |
|---|---|---|---|
| 1146449 | 11/1957 | France | 264/529 |
| 48-9473 | 3/1973 | Japan | 264/515 |
| 49-33348 | 9/1974 | Japan | 264/515 |
| 50-25513 | 8/1975 | Japan | 264/515 |
| 51-42144 | 11/1976 | Japan | 264/515 |
| 79-024427 | 8/1979 | Japan | 264/515 |
| 80-048973 | 12/1980 | Japan | 264/515 |
| 55-161623 | 12/1980 | Japan | 264/516 |

OTHER PUBLICATIONS

"Out of Sight" advertisement; Coty, N.Y.; 1 p.; 1990.
"Delco Dura Power Batteries" catalog sheets; Delco Remy, Anderson, Ind. 2 pages; no date.
"Auto Batteries" article; Consumer Reports; p. 94; Feb., 1985.
"Injection Molding Handbook" by D. Rosato et al.; title page and pp. v, 760–769; 1986.

*Primary Examiner*—Jan H. Silbaugh
*Assistant Examiner*—Catherine Timm
*Attorney, Agent, or Firm*—Sheldon & Mak

[57] ABSTRACT

A method for making a multiple compartment container by providing a mold for defining an outside contour surface of the container; providing a partition member; locating the partition member within the mold; the mold making localized contact only with the partition member for uniformly spacing an edge profile of the partition member from the outside contour surface between adjacent compartment regions of the mold; feeding a plastic material simultaneously into each of the compartment regions of the mold; and forming the plastic material against the outside contour surface of the mold and against opposite sides of the partition member, the plastic material totally enclosing the partition except to the extent of the localized contact with the mold, the partition member being retained between adjacent compartments of the solidified container following removal from the mold. The molded material thus connects the adjacent compartment regions around substantially all of the edge profile for full structural integrity of the container. The partition member can have protruding prongs for making the localized contact. Alternatively or in addition, the mold can have boss portions extending within the outside contour surface for locally contacting the partition member.

5 Claims, 4 Drawing Sheets

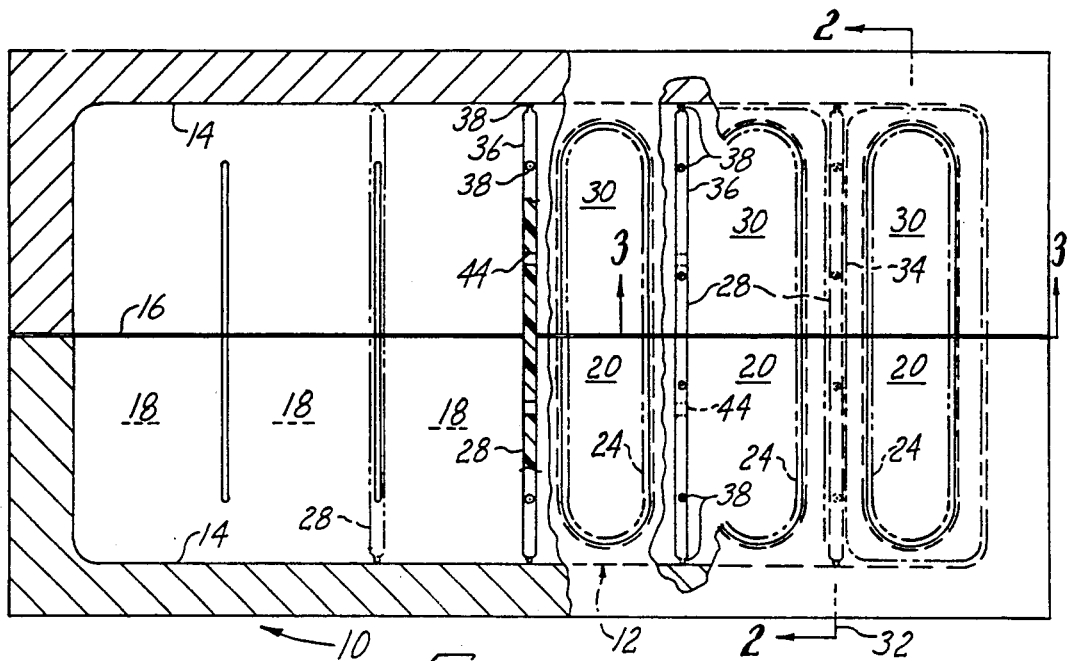
FIG. 1
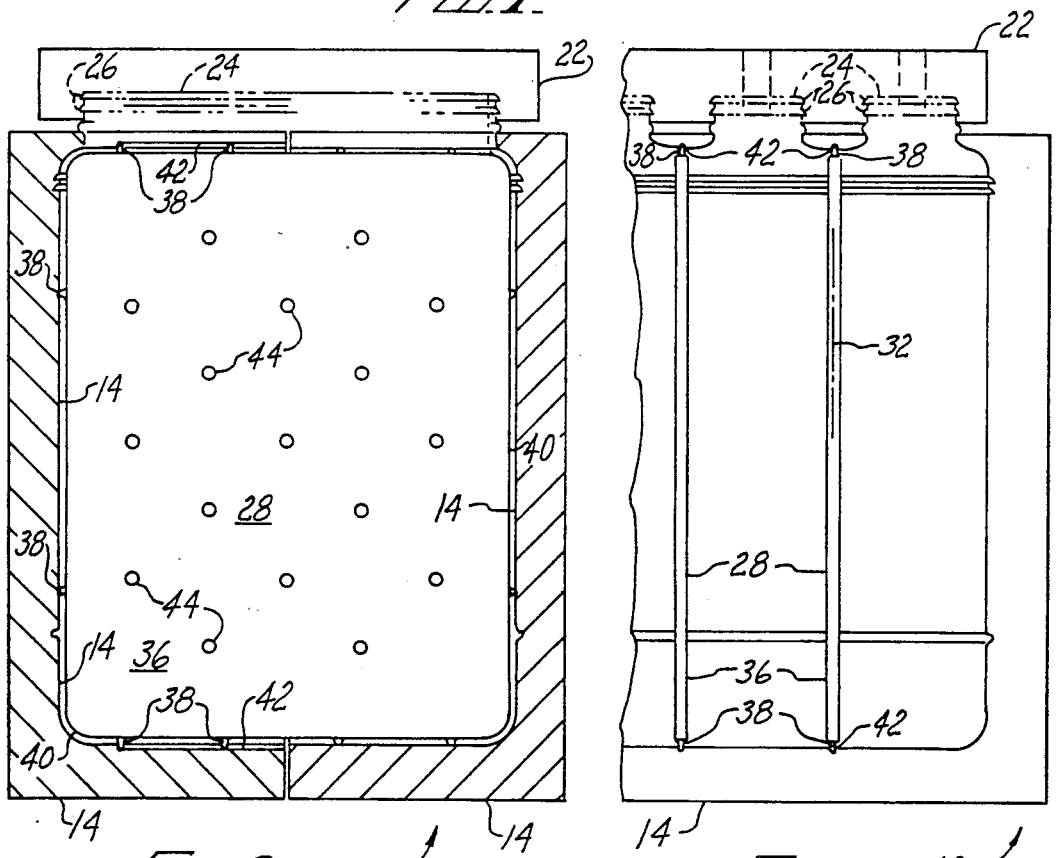
FIG. 2
FIG. 3

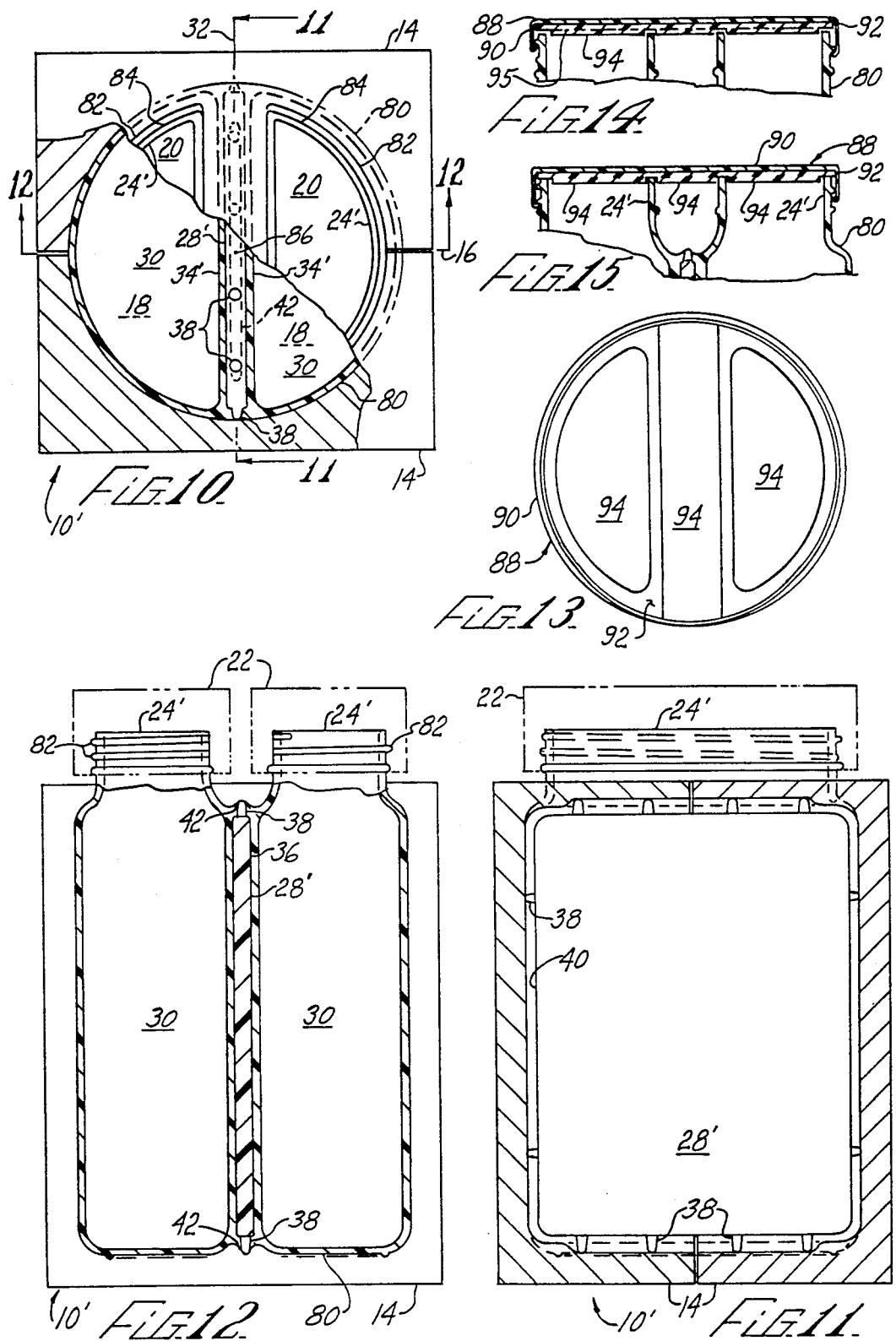

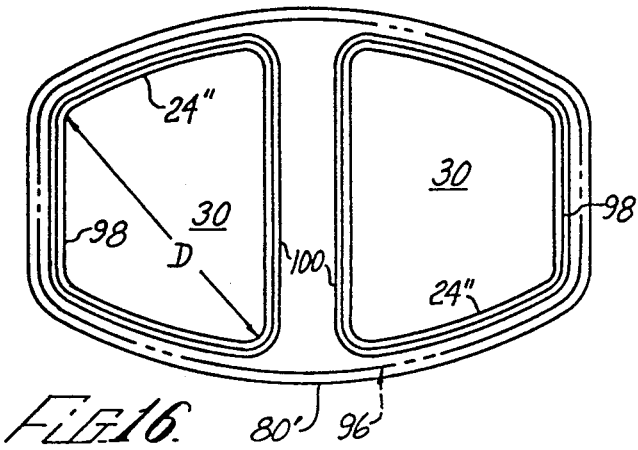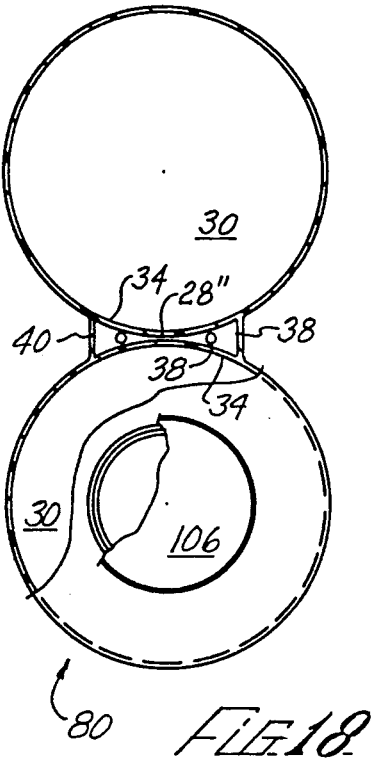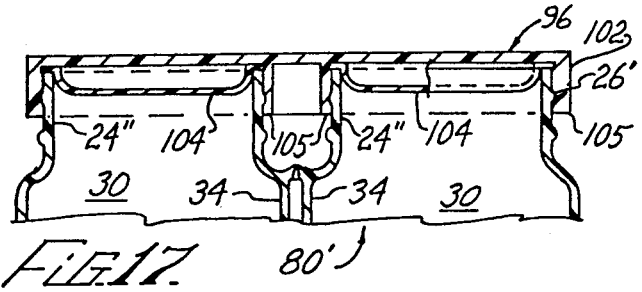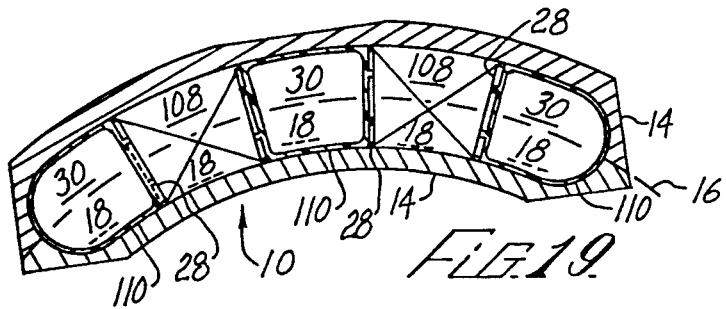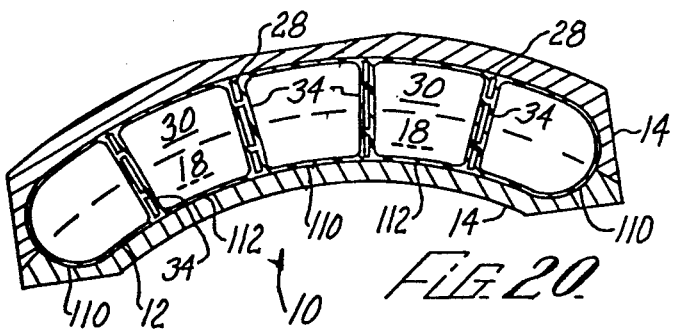

EXTRUSION BLOW MOLDING PROCESS FOR FORMING MULTI-COMPARTMENT CONTAINERS

BACKGROUND

The present invention relates to blow molding of blow molded containers, and more particularly to multiple compartment containers such as bottles and the like, multi-compartmented products such as multi-celled batteries, and multi-component products such as cosmetics and certain foods, in powders, creams, solids, or liquids.

Plastic molding is done in a variety of ways. For example in straight injection molding, a mold cavity is completely filled with a molten thermoplastic material at high pressure via one or more sprue openings of the cavity. Once the material has solidified, the mold is opened and the molded part is ejected. Some draft for the mold is generally required, and necked cavities are normally prohibited in this process, because of a need for a "contractible" male mold portion. A multiple cavity mold that does not require significant draft, however, is disclosed in U.S. Pat. No. 3,673,302 to Halsall et al.

Necked containers are commonly produced in a variety of "blow-molding" processes, wherein a layer of semi-molten plastic is formed against the walls of a female mold cavity by differential gas pressure. In such processes, a hollow plastic tube or parison is positioned within the cavity in a high temperature condition, then expanded against the cavity, usually by compressed air. As compared with straight injection molding, blow molding of bottles and other containers is considerably less expensive, primarily because of the absence of a male mold portion, and because lower molding pressures and temperatures are required.

As used herein, the term "blow molding" is meant in its generic sense, including but not limited to vacuum forming, vacuum blow molding (including air-assist), centrifugal or rotational molding, stretch-blow molding wherein the parison is axially stretched by mechanical means prior to final forming, injection blow molding wherein the parison is injection molded prior to its being positioned within the cavity, and extrusion blow molding wherein the parison is formed by an extruder die as it is being introduced into the cavity.

Multiple compartment necked containers can be produced by joining separate containers to form a unitized package, such as is described in U.S. Pat. No. 4,196,808 to Pardo. U.S. Pat. Nos. D214,549 to Ledewitz, U.S. Pat. No. D192,980 to Mangini et al., and U.S. Pat. No. D280,599 to Green each show necked multiple compartment containers that are integrally molded. A problem with such containers is that the mold itself does not define the shape of an interior wall between the compartments. Instead, the interior wall is formed by joinder of expanding bubble portions of the plastic material that are formed in mold cavity portions that define the exterior shapes of adjoining compartments of the container. The effects of gravity and/or a slight pressure differential between the compartments during molding can produce an unwanted wall contour or complete failure of the interior wall. Thus the interior wall is typically made quite narrow by the use of inward mold projections that form slots or depressions on opposite sides of the container in line with the interior wall. A disadvantage of this method for forming multiple compartment containers is that it is often desired that the exterior of the container be free of such slots or depressions.

Another problem with such integrally formed containers is that the mold cycle time is made longer to the extent that inwardly extending mold projections or blades for forming the slots require longer cooling times. Also, the interior wall, not being in contact with the mold, is not cooled thereby. Thus the interior wall is subject to deformation even after the exterior walls have substantially solidified, especially upon ejection of the part from the mold and transport thereof. A further problem, especially when the depth of opposing depressions approaches the width of the container, is that the container is weakened such that it can flex, the region between the slots acting as a hinge. Moreover, the slots collect contamination and are difficult to clean.

Multiple compartment containers are commonly used in the production of multi-celled batteries, such as in the automotive industry. The cells are in separate compartments, which must be sealed from each other. In conventional construction, a case of the battery is injection molded with partitions for defining the compartments, the partitions extending to flush with outside walls of the case. Interconnections between the cells are made by a system of angle plates and bolts that sealingly protrude the partitions. These interconnections are complicated and awkward to assemble. Also, a cover for the case must be sealingly connected along each of the partitions as well as along the outside walls of the case. It is difficult to reliably obtain such sealed connections. Moreover, detection of flawed seals is cumbersome and expensive, and repair in such instances is at best only marginally practical.

Thus there is a need for a multiple compartment container that can be inexpensively molded without the above disadvantages.

SUMMARY

The present invention is directed in one aspect to a multiple compartment container that meets this need. The container includes a partition member; and a molded plastic material forming walls of the container and covering opposite sides of the partition member, between adjacent compartments of the container. The molded plastic material can substantially enclose the partition member. Preferably the partition member is formed with at least one tie passage therein for connecting the material on opposite sides of an interior region of the partition member. The partition member can be substantially planar. The partition member, defining a partition surface extending substantially midway between the adjacent compartments and intersecting an outside profile of the container, has an edge profile, at least a portion of which is substantially uniformly spaced within the container from the outside contour for allowing the plastic material to flow between the edge profile and the inside surface of the mold. The partition member can have a plurality of registration prongs, each being locally coplanar with the partition surface and projecting from the edge profile to proximate the outside contour for facilitating registration of the partition member within the container.

Opposite sides of the partition member can be cylindrically concave for defining smooth continuations of adjacent compartments on opposite sides of the partition member. As used herein, the term "cylindrical"

means having a surface that is generated by a straight line that moves in a path that is parallel to a longitudinal axis of the surface. The adjacent compartments can be circularly cylindrical, the partition member a cross-sectional shape including a pair of outwardly facing concave substantially circular segments.

A plurality of the compartments can have corresponding neck openings, and the container can further include an openable lid member for sealingly closing at least two of the neck openings. A pair of the neck openings can be formed in a spaced pair of neck members such that the lid member threadingly engages both of the neck members. The container can also include a lid insert rotatably located within the lid member and being sealingly clamped between the neck members and the lid member when the lid member is tightened onto the neck members, and means for registering the lid insert in rotational alignment with the neck openings as the lid member is being tightened for preventing rotation of the lid insert relative to the neck members during further tightening of the lid member. The means for registering can include a downwardly protruding portion of the lid insert for engaging a side portion of at least one of the neck members while preventing the rotation of the lid insert. The downwardly protruding portions can be molded onto a disk-shaped portion of the lid insert.

Alternatively, the lid member can snap onto the neck members. Preferably a pair of parallel-spaced neck portions of at least one neck member provides an enlarged diagonal spacing within the neck member for manipulating a spoon or other utensil during use of the container.

In another aspect of the invention, a multi-celled battery includes the container with a plurality of the compartments having corresponding neck openings, in combination with cell plate means in each of the compartments, each cell plate means having a pair of parallel, upstanding conductive terminal members for conducting electrical current to and from the plate means; cover member means sealingly closing the neck openings, the terminal members sealingly protruding the cover member means; and bus means external of the compartments and the cover member means for serially connecting at least some of the plate means by the terminal members. The cover member means can include a separate cover for each of the neck openings. The bus means can include a conductive strap member connecting one of the terminal members of neighboring cell plate means. The container can be formed to include an external lid discontinuity surrounding the compartments proximate the neck openings, the battery further including a lid member retained by the lid discontinuity for covering the bus means, an end pair of the terminal members protruding the lid member for external electrical connections of the battery.

In a further aspect of the invention, a method for making a multiple compartment container includes the steps of providing a mold for defining an outside contour of the container; locating a partition member within the mold for defining a partition surface that intersects the outside contour between adjacent compartment regions of the mold; feeding a plastic material into the mold; forming the plastic material against the outside contour surface and against opposite sides of the partition member; solidifying the plastic material; and removing the solidified material from the mold, the partition member being retained between adjacent compartments of the container. The mold can be formed for defining a neck opening of the container. The step of feeding the plastic material can include feeding the material through the neck opening portion of the mold. A plurality of the neck opening portions of the mold can define corresponding neck openings for respective compartments of the container. The step of feeding the plastic material can include the step of simultaneously feeding the material through each of the neck opening portions of the mold, the step of forming the material including the step of simultaneously forming the material against the opposite sides of the partition member.

The step of feeding the plastic material can include the steps of feeding a first portion of the plastic material for forming a first compartment of the container; solidifying the first portion of the material; and feeding a second portion of the plastic material for forming a second compartment of the container subsequent to the step of solidifying the first portion of the material. The step of locating the partition member can also be provided by the steps of feeding and solidifying the first portion of the material.

DRAWINGS

These and other features, aspects, and advantages of the present invention will become better understood with reference to the following description, appended claims, and accompanying drawings where:

FIG. 1 is a fragmentary sectional plan view of a blow molding apparatus for a multiple compartment container according to the present invention;

FIG. 2 is a sectional elevational end view of the apparatus of FIG. 1 on line 2—2 therein;

FIG. 3 is a fragmentary sectional elevational side view of a portion of the apparatus of FIG. 1 on line 3—3 therein;

FIG. 10 is a fragmentary sectional plan view of an alternative configuration of the apparatus and container of FIG. 1;

FIG. 11 is a sectional elevational view of the apparatus of FIG. 10 on line 11—11 therein;

FIG. 12 is a sectional elevational view of the apparatus of FIG. 10 on line 12—12 therein;

FIG. 13 is a bottom plan view of a lid for the container of FIG. 10;

FIG. 14 is a fragmentary sectional elevational view showing the lid of FIG. 13 partially closed on the container of FIG. 10;

FIG. 15 is a fragmentary sectional elevational view as in FIG. 14, showing the lid of FIG. 13 fully tightened onto the container of FIG. 10;

FIG. 16 is a plan view showing an alternative configuration of the container of FIG. 10;

FIG. 17 is a fragmentary sectional elevational view showing an alternative configuration of the lid of FIG. 13 on the container of FIG. 16;

FIG. 18 is a fragmentary plan view showing an alternative configuration of the container of FIG. 10;

FIG. 19 is a fragmentary sectional elevational diagram view showing an alternative configuration of the apparatus of FIG. 10 for forming a first set of container chambers; and FIG. 20 is a fragmentary sectional end diagram view showing the apparatus of FIG. 19 configured for forming a second set of container chambers integral with the first container chamber.

DESCRIPTION

Figures 4, 5:
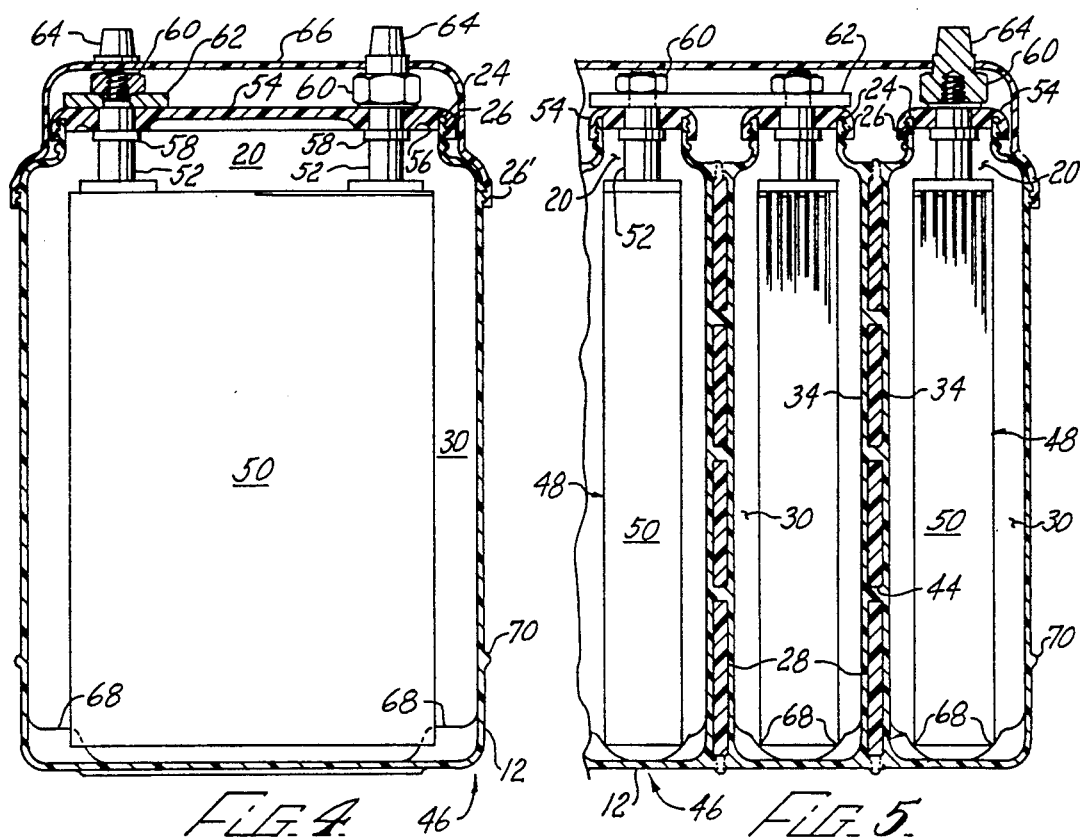
FIG. 4 is a sectional elevational end view as in FIG. 2, showing a battery incorporating the container of FIG. 1.
FIG. 5 is a fragmentary sectional elevational side view as in FIG. 3, showing the battery of FIG. 4.

The present invention is directed to a multiple compartment container that is particularly suitable for blow molding. With reference to FIGS. 1-3 of the drawings, a mold 10 for producing a multiple compartment container 12 includes a facing pair of female mold cavities 14 that define an external body configuration for the container 12 to be molded therein on opposite sides of a split seam or parting surface 16. By way of example, the container 12 of FIGS. 1-5 provides a case for a multi-celled battery, described below, the container 12 having a plurality of container cavities 18. As further shown in the drawings, the mold 10 defines a plurality of neck regions 20 through which a parison of plastic material for the container 12 is fed at elevated temperature in a conventional manner from a gang-type extruder die 22 (or individual extruder dies). A neck member 24 is associated with each neck region 20, a pair of snap-fitting protrusions 26 being formed on each neck member 24. Typically, the mold 10 is provided with conventional extractor means (not shown) and cooling means (also not shown).

Where the parison is formed by an extruder and when the parison exits the die and develops a preset length, the split cavity mold 10 closes around the parison and pinches one end. Compressed air inflates the parison against the hollow blow mold surfaces, which cool the inflated parison to the blow mold configuration. Upon contact with the cool mold wall, the plastic cools and sets the part shape. The mold 10 opens, ejects the blown part or container 12, and closes around the parison to repeat the cycle. A parison programmer may be used for shaping the parison to match complex blow mold shapes, and multiple station clamp systems can be used for improving output through the use of multiple molds.

According to the present invention, the mold 10 includes a partition member 28 for separating adjacent compartments 30 of the container 12, there being one less of the partition members 28 than the number of the compartments 30. Each partition member 28 nominally defines a partition surface 32 that is typically planar, but may have other shapes. The partition members 28, which become an integral part of corresponding partition portions 34 of the container 12 during the molding process described herein, are retained and located within the mold 10 by a plurality of discontinuities in one or both of the mold 10 and each partition member 28. For example, and as shown in FIGS. 1-3, each partition member 28 is formed as a planar body portion 36 having a plurality of coplanar, outwardly projecting prong portions 38 for engaging the mold cavities 14, whereby an edge profile 40 of the body portion 36 is spaced away from the mold cavities 14. A pair of registration slots 42 in each of the mold cavities 14 locates each of the partition members 28 within the mold 10 in a direction generally perpendicular to the partition surface 32.

During the blow mo . process, which can be any variation of a process in which a layer of semi-molten plastic material is formed against-a mold cavity by differential fluid pressure, the plastic material flows between the edge profile 40 of each partition member 28 and the mold cavity 14, substantially enclosing the partition member 28. The partition members 28 thus form portions of the mold 10 during the molding process for defining the shapes and locations of the partition portions 34 of the container 12. The partition members 28 then become extracted from the mold 10, being part of the container 12.

Normally, the partition member 28 is also a molded plastic part, the plastic preferably having a slightly higher melting point that the material of the container 12 for maintaining the structural integrity of the partition members during the process of blow molding the container 12. It is anticipated, however, that even with the same melting point, there would normally be no failure of the partition member 28 because of cooling of the partition portions 34 by the body portion 36 of each partition member 28. Alternatively, the partition member 28 can be made from metal. In the configuration of FIGS. 1-3, the extremities of the prong portions 38 become minimally exposed at the exterior of the container 12 to the extent of locating contact between the prong portions 38 and the mold cavities 14 during the feeding and solidifying of the plastic material.

In injection blow molding wherein the parison is formed in an auxiliary injection mold station, the partition member 28 can be injection molded in the auxiliary mold station, then transferred to the mold 10 by a mechanism similar to that used for transferring the parison. Alternatively, the partition member 28 can be stockpiled at room temperature, being used as needed.

As best shown in FIG. 2, each partition member 28 can be formed with one or more tie passages 44 for connecting the plastic material between opposite sides of the partition member 28 within the edge profile 40. The tie passages 44 thus contribute to the structural integrity of the partition portions 34 by preventing separation of the layers of plastic material from opposite sides of the partition member 28.

With further reference to FIGS. 4 and 5, a multi-celled battery 46 includes the container 12 as described above, each of the compartments 30 housing a cell unit 48 that includes a plate assembly 50 and a pair of rigidly connected, upstanding terminal posts 52 that extend upwardly through respective ones of the neck regions 20. A cell cap member 54 sealingly covers each of the compartments 30 by engaging the associated neck member 24, a redundant seal being provided by a plug portion 56 of the cap member 54 that extends within the neck member 24, in combination with sealing engagement of the cap member 54 over each of the snap-fitting protrusions 26, the protrusions 26 also retaining the cap member 54 in place. The terminal posts 52 of each cell unit 48 also protrude the respective cell cap member 54, the cap members 54 being sealingly clamped between a shoulder portion 58 of each terminal post 52 and clamp nut means 60 that threadingly engages the post 52. As best shown in FIG. 5, serial electrical connections between the cell units 48 are made by one or more bus straps 62 that are fitted over a pair of the terminal posts 52 of adjacent plate assemblies 50, the straps 62 being clamped between the nut means 60 and the associated cell cap member 54. An end terminal 64 for the battery 46 also serves as the clamp nut means 60 on at least two of the terminal posts 52, for providing external electrical connections to the battery 46. As further shown in FIGS. 4 and 5, a cover member 66, which can be injection molded from a suitable plastic, protectively covers the bus straps 62, being protruded by the end terminals 64. The cover member 66 is sealingly retained on the container 12 by counterparts of the protrusions 26, designated 26' in the drawings.

Structural support for the plate assembly 50 is provided by the connection of the terminal post 52 to the cell cap member 54. Further structural support is provided by one or more locating portions 68 of the container 12 proximate the lower extremity of each of the compartments 30 as shown in FIGS. 4 and 5. As further shown in FIGS. 4 and 5, a belt member 70 forms a perimeter protrusion of the container 12 for facilitating clamping of the battery 46 onto a suitable mounting surface (not shown).

Figure 6:
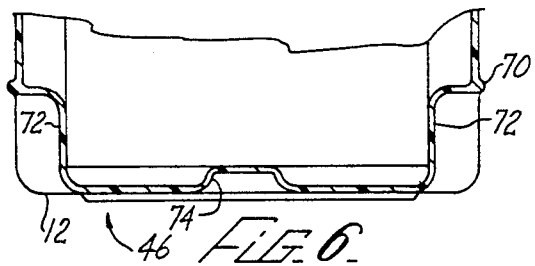
FIG. 6 is a fragmentary sectional elevational end view of a portion of the battery of FIG. 4.
Figure 7:
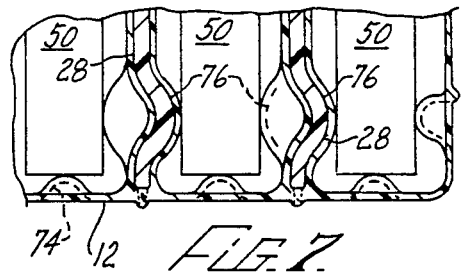
FIG. 7 is a fragmentary sectional elevational side view of the battery of FIG. 6 on line 7—7 therein.

With further reference to FIGS. 6 and 7, the container 12 can include a variety of supporting provisions for the contents of the compartments 30. For example, and as shown in FIG. 6, a side indentation 72 is formed in opposite sides of the container 12 immediately below the belt member 70 for constraining lateral movement of each plate assembly 50 in the plane of the terminal posts 52. A bottom indentation 74 of the container 12 also augments support of the plate assembly 50 in a direction axially parallel to the terminal posts 52. Further, and as shown in FIG. 7, each of the partition members 28 can have a plurality of crown portions 76 therein, the crown portions 76 facing in opposite directions from the partition surface 32 for supporting the adjacent plate assemblies 50 in a direction perpendicular to the terminal post planes of the respective cell units 48.

Figure 8:
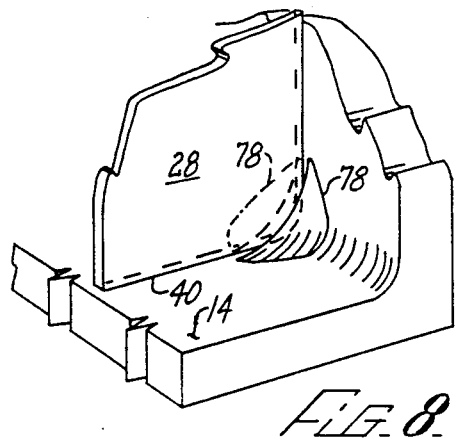
FIG. 8 is a fragmentary elevational perspective view showing an alternative configuration of a portion of the molding apparatus of FIG. 1.
Figure 9:
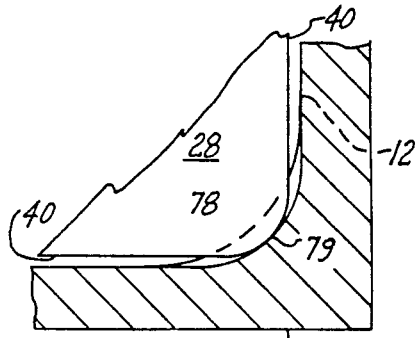
FIG. 9 is an end sectional elevational detail view of a portion of the apparatus of FIG. 8.

With further reference to FIGS. 8 and 9, an alternative configuration for the support of the partition members 28 in the mold cavities 14 is provided by a pair of boss portions 78 of each mold cavity 14 for locally supporting opposite sides of the partition member 28. While the boss portions 78 provide support for the partition member 28 in a direction perpendicular to the partition surface 32, support in the plane of the partition surface 32 is provided by direct localized contact by portions of the mold cavity 14 that define the outside contours of the container 12 against the edge profile 40 of the partition member 28, as best shown at 79 in FIG. 9.

With further reference to FIGS. 10-12, an alternative configuration of the mold 10, designated mold 10', provides the container 12 configured as a multi-compartment jar or bottle 80. The mold 10' has counterparts of the mold cavities 14, the parting surface 16, the container cavities 18, and the neck regions 20. Similarly, a counterpart of the extruder die 22 forms a pair of neck members 24' having counterparts of the protrusions 26, designated thread members 82. The mold 10' also has a counterpart of the partition member 28, designated partition member 28' for forming a pair of the compartments 30 in the bottle 80, the partition member 28' defining counterparts of the partition surface 32 and the partition portions, designated 34'. In the configuration of FIGS. 10-12, the partition member 28' also has counterparts of the body portion 36, the prong portions 38, and the edge profile 40, the prong portions 38 at the top and bottom of the partition member 28' also engaging counterparts of the registration slots 42.

As best shown in FIG. 10, an outwardly facing contour portion 84 of each neck member 24' is circularly cylindrical about a common centrally located thread axis 86 such that the thread members 82 form helical segments for threaded engagement with a lid, described below. Also, the neck members 24' are spaced apart for avoiding inadvertent contamination of the contents of each of the compartments 30 when material is being removed from the other compartment 30.

With further reference to FIGS. 13-15, a lid assembly 88 for the bottle 80 threadingly engages the thread members 82 for simultaneously sealingly closing each of the neck members 24'. The lid assembly 88 includes an exterior lid member 90 having a generally disk-shaped gasket member 92 rotatably mounted therein, the gasket member 92 being sealingly clamped between the lid member 90 and the tops of the neck members 24' when the lid member 90 is tightened onto the thread members 82. At least one registration portion 94 of the gasket member 92 projects below the tops of the neck members 24' for locking the gasket member 92 into rotational alignment with the neck members 24' as the lid member 90 is advanced toward its clamped position. As shown in FIG. 14, when the lid member 90 is advanced partway onto the neck members 24', the registration projection(s) 94 advances into contact with the top of one or both of the neck members 24'. At this point, the gasket member 92 continues to rotate with the lid member 90 as the lid assembly 88 is further advanced on the thread members 82, the lid member 90 and the gasket member 92 being slightly deflected away from the tops of the neck members 24' until the registration projection(s) 94 become aligned with the neck members 24', the lid assembly 88 assuming a relaxed configuration wherein the registration projection(s) 94 extend slightly below the tops of the neck members 24' as shown in FIG. 14, the gasket member 92 being prevented from further rotation by engagement of at least one of the projections 94 with a side wall of one of the neck members 24'. Continued rotation of the lid member 90 for advancing the lid assembly 88 onto the thread members 82 produces the position shown in FIG. 15, wherein the gasket member 92 is clamped between the lid member 90 and the tops of the neck members 24'. Conversely, when the lid assembly 88 is removed from the bottle 80, the gasket member 92 is prevented from rotating with respect to the neck members 24' until the registration projection(s) 94 clear the tops of the neck members 24', from which point the gasket member 92 continues to rotate with the lid member 90 until complete removal of the lid assembly 88 is effected.

The lid member 90 can be made of metal or a suitable plastic such as polypropylene, which can be injection molded. The gasket member 92 can be injection molded, then snapped into the lid member 90. Alternatively, a disk portion 95 of the gasket member 92 can be snapped in place, the projections 94 being injection molded (and fused) onto the disk portion 95.

With further reference to FIGS. 16 and 17, an alternative configuration of the bottle 80, designated 80', is provided with a snap on-type counterpart of the lid assembly 88, designated lid assembly 96. The lid assembly 96 is openably connected to counterparts of the neck members 24, designated neck members 24" in FIGS. 16 and 17. An important feature of the bottle 80' is that its neck members 24" have an outwardly facing contour that is non-circular, In particular, each of the neck members 24" has an outside extremity portion 98 that is generally flat and parallel with an inside extremity portion 100 that defines a separation of each neck member 24" with the other neck member 24". Relatively sharply curved corner contours are thus formed in each neck member 24" for providing an enhanced diagonal clearance distance D within each neck member 24", for facilitating manipulation of a spoon, knife, or other utensil within each neck member 24" when it is desired to extract a food product or other material from a selected one of the compartments 30 of the bottle 80'.

The lid assembly 96 has a snap-type lid member 102 that releasably engages counterparts of the protrusions 26, designated 26' in FIGS. 16 and 17. A pair of gasket members 104 of the lid assembly 96 are sealingly clamped between the lid member 102 and the tops of the neck members 24" by the engagement with the protrusions 26'. The gasket members 104, which can have a uniform thickness, preferably extend into the neck member 24" for permitting excess gas pressure within the bottle 80' to equalize by upward deflection of the extending portions of the gasket member 104. Also, a flange portion 105 of the lid member 102 separately encloses each of the neck members 24" for strengthening the sealed connection of the lid assembly 96 to the bottle 80'.

With further reference to FIG. 18, another alternative configuration of the bottle 80 has compartments 30 circularly cylindrically shaped on opposite sides of a concave counterpart of the partition member 28, designated partition member 28". In this configuration, separate counterparts of the lid assembly 88, designated 106, sealingly close each of the compartments 30. The extra thickness along the side portions of the edge profile 40 enhances the longitudinal strength and rigidity of the partition member 28".

In a further aspect of the invention, a method for making the container 12 includes the steps of providing a mold 10 for defining an outside contour of the container 12; locating the partition member 28 within the mold 10 for defining a partition surface 32 that intersects the outside contour between adjacent compartments 30 of the mold 10; feeding a plastic material into the mold 10; forming the plastic material against the outside contour surface and against opposite sides of the partition member 28; solidifying the plastic material; and removing the solidified material from the mold 10, the partition member 28 being retained between adjacent compartments 30 of the container 12.

With further reference to FIGS. 19 and 20, an alternative method for molding the container 12 is provided by temporarily inserting a plug member 108 in alternate ones of the container cavities 18 of the mold 10, the plug members 108 releasably supporting the partition members 28 against molding pressure from within the other cavities 18 during molding of corresponding container compartments 30 as described above. Once this first molding step is complete as shown in FIG. 19, the plug members 108 can be removed with the mold 10 opened, leaving the partition members 28 attached to the first-molded portions of the container 12, designated portions 110. With the mold 10 again closed about the first-molded portions 110, the alternate ones of the cavities 18 previously having the plug members 108 are blow molded for producing the remaining container cavities 30, the last-molded portions, designated 112, completing the container 12 as shown in FIG. 20.

As also illustrated in FIGS. 19 and 20, the parting surface 16 can be curved, the container 12 also being generally curved on opposite sides of the parting surface 16 for providing a desired aesthetic appearance of the container 12. This curved configuration also advantageously provides enhanced lateral stability of the container 12 when it is resting on a supporting surface.

Although the present invention has been described in considerable detail with reference to certain preferred versions thereof, other versions are possible. For example, the first-molded portions 110 in FIGS. 19 and 20 can serve in place of the partition members 28 as mold surfaces against which the last-molded portions 112 are molded. In this case, the material for the last-molded portions 112 is selected for a slightly reduced melting temperature than that of the first-molded portions 110. Therefore, the spirit and scope of the appended claims should not necessarily be limited to the description of the preferred versions contained herein.

What is claimed is:

1. A method for making a multiple compartment container, comprising the steps of:
   (a) providing a mold for defining an outside contour surface of the container;
   (b) providing a partition member having opposite sides and a perimeter edge profile, a plurality of spaced prong portions extending outwardly from the edge profile, the prong portions being intersected by a partition surface extending from between the opposite sides of the partition member;
   (c) locating the partition member within the mold, the prong portions making not more than localized contact with the outside contour surface for uniformly spacing the edge profile from the outside contour surface between adjacent compartment regions of the mold;
   (d) feeding a parison of plastic material simultaneously into each of the compartment regions of the mold;
   (e) blow molding the parison of plastic material against the outside contour surface of the mold and against opposite sides of the partition member, the plastic material totally enclosing the partition member except to the extent of the localized contact with the outside contour surface by the prong portions;
   (f) solidifying the plastic material to form the multiple compartment container; and
   (g) removing the multiple compartment container from the mold, the partition member being retained between adjacent compartments of the container.

2. The method of claim 1, wherein the step of locating the partition member includes the step of positioning convex regions of the prong members proximate corresponding registration locations on the outside contour surface of the mold, the registration locations being less concave at the contact locations than the convexity of the corresponding convex regions of the prong portions for substantially avoiding area contact between the prong portions and the outside contour surface.

3. The method of claim 1, wherein the step of blow molding the parison of plastic material comprises the step of blow molding a substantially uniform thickness of the material between the partition member and the outside contour surface between each of the prong portions for continuously supportively connecting portions of the container between the compartment regions.

4. A method for making a multiple compartment container, comprising the steps of:

(a) providing a partition member having opposite sides and a perimeter edge profile;

(b) providing a mold for defining an outside contour surface of the container, the mold having a mold cavity and a pair of boss portions projecting into the mold cavity;

(c) locating the partition member within the mold in localized contact with the boss portions for holding the partition member between adjacent compartment regions of the mold, the partition member making only localized contact with the mold only at the boss portions for substantially avoiding area contact between the partition member and the mold, thereby allowing most of the edge profile to be substantially uniformly spaced from the outside contour surface;

(d) feeding a parison of plastic material simultaneously into each of the compartment regions of the mold;

(e) blow molding the parison of plastic material against the outside contour surface of the mold and against opposite sides of the partition member, the plastic material totally enclosing the partition member except to the extent of the localized contact with the mold at the boss portions;

(f) solidifying the plastic material to form the multiple compartment container; and (g) removing the multiple compartment container from the mold, the partition member being retained between adjacent compartments of the container.

5. The method of claim 4, wherein the step of blow molding the parison of plastic material comprises the step of molding a substantially uniform thickness of the material between the partition member and the outside contour surface between each of the boss portions for continuously supportively connecting portions of the container between the compartment regions.

* * * * *